United States Patent [19]

Schneider-Obermann et al.

[11] Patent Number: 5,377,208
[45] Date of Patent: Dec. 27, 1994

[54] TRANSMISSION SYSTEM WITH RANDOM ERROR AND BURST ERROR CORRECTION FOR A CYCLICALLY CODED DIGITAL SIGNAL

[75] Inventors: Herbert Schneider-Obermann, Erlangen; Gerd Zimmermann, Eckental; Wolfgang Koch, Heroldsberg, all of Germany

[73] Assignee: U.S. Philips Corporation, New York, N.Y.

[21] Appl. No.: 966,790

[22] Filed: Oct. 27, 1992

[30] Foreign Application Priority Data

Nov. 2, 1991 [DE] Germany ............................. 4136118

[51] Int. Cl.$^5$ ............................................. G06F 11/10
[52] U.S. Cl. ................................. 371/38.1; 371/39.1; 371/44; 371/45
[58] Field of Search ..................... 371/34, 35, 38.1, 41, 371/44, 45, 39.1

[56] References Cited

U.S. PATENT DOCUMENTS

| 3,775,746 | 11/1973 | Boudreau et al. | 340/146.1 AL |
| 3,831,143 | 8/1974 | Trafton | 340/146.1 AL |
| 4,592,054 | 5/1986 | Namekawa et al. | 371/39 |
| 4,951,284 | 8/1990 | Abdel-Ghaffar et al. | 371/38.1 |
| 5,179,560 | 1/1993 | Yamagishi et al. | 371/38.1 |

OTHER PUBLICATIONS

Microprocessors and Microsystems Bd. 14, Nr. 4, May 1990, London, GB pp. 256–262 by Almaini et al "ASIC implementation of a programmable error-trapping decoder for binary codes of length 15".

S. Lin et al., "Error Control Coding Fundamentals and Application", pp. 125–131 to 259–282.

*Primary Examiner*—Jr. Beausoliel
*Assistant Examiner*—Norman M. Wright
*Attorney, Agent, or Firm*—David R. Treacy

[57] ABSTRACT

The invention relates to a transmission system comprising a transmitter (100) which includes a coder for coding an information signal (11) into a digital signal (11, 12) constituted by the information signal (11) and a redundancy signal (12), the redundancy signal (12) being generated by way of a cyclic code from the information signal (11), and comprising a receiver (101) which includes a decoder with a storage unit (2) for storing the information signal (11) and with an error correction means which has an optionally feedback shift register (3) for processing the digital signal (11, 12). The transmission system is to make both the correction of burst errors as well as the correction of random errors possible in a single error correction means. There is proposed that the error correction means of the decoder comprises a burst error detection means (4) for producing a first error information signal (B) from predeterminable storage contents ($S_0 \ldots S_{11}$) of the shift register (3) and a random error detection means (5) for producing a second error information signal (E) from the aggregate storage contents ($S_0 \ldots S_{11}$) of the shift register (3), and that a control means (8) is provided for evaluating the first error information signal (B) and second error information signal (E) and combining means (E1) are provided for combining the storage contents ($S_0 \ldots S_{17}$) of the shift register (3) with the storage contents of the storage unit (2). The transmission system may be used for example, in video communication systems.

10 Claims, 1 Drawing Sheet

TRANSMISSION SYSTEM WITH RANDOM ERROR AND BURST ERROR CORRECTION FOR A CYCLICALLY CODED DIGITAL SIGNAL

BACKGROUND OF THE INVENTION

The invention relates to a transmission system comprising a transmitter which includes a coder for coding an information signal to be transmitted into a digital signal constituted by the information signal and a redundancy signal, the redundancy signal being generated by way of a cyclic code from the information signal to be transmitted, and comprising a receiver which includes a decoder with a storage unit for storing a received information signal and with an error correction means which comprises a feedback shift register for processing the received digital signal.

The invention also relates to a receiver, a decoder and a videophone comprising such a decoder.

A transmission system of this type is used, for example, in video communication for videophones. In the receiver a decoder is then necessary, for example, for decoding a digital signal coded with the what is commonly referred to as BCH code (Bose-Chandhuri-Hocquenghem). A digital signal coded in this manner is used, for example, for video communication. During the coding procedure, an information signal to be transmitted is converted by means of a coding circuit into a digital signal that comprises the information signal as well as a redundancy signal. The redundancy signal is then generated by means of a cyclic code from the information signal to be transmitted.

U.S. Pat. No. 4,592,054 has disclosed a decoder in which a cyclically coded digital signal constituted by an information signal and a redundancy signal is applied to a random error as well as a burst error detection means which operate in parallel and independently. With the aid of a decision means either the output signal of the random error detection means or the output signal of the burst error detection means is switched to the output of the decoder.

SUMMARY OF THE INVENTION

It is an object of the invention to provide a transmission system of the type mentioned in the opening paragraph, which makes the correction of burst errors as well as the correction of random errors possible in a simple manner.

This object is achieved in a transmission system of the type mentioned in the opening paragraph, in that the error correction means of the decoder comprises a burst error detection means for producing from predeterminable storage contents of the shift register a first error information signal featuring a burst error and includes a random error detection means for producing from the aggregate storage contents of the shift register a second error information signal featuring a random error, and in that a control means is provided for evaluating the first and second error information signals and in that means are provided for combining the storage contents of the shift register with the storage contents of the storage unit.

Such a transmission system is suitable for transmitting a BCH coded digital signal. In the transmitter the information signal to be transmitted is converted by means of the coder into the digital signal to be transmitted which is constituted by a redundancy signal generated from the information signal and the information signal itself.

This digital signal is conveyed to the receiver over a transmission channel, for example, a cable transmission link or a radio transmission channel. The receiver comprises the decoder and a simultaneous check is made on the storage contents of the shift register for burst errors of a specific length as well as random errors of a specific number once the digital signal has been read-in in the decoder i.e. in the storage unit as well as the shift register. The thus found first or second error information signal, featuring a burst error or a random error respectively, is applied to the control means which decides which measures for error correction are to be taken, whether an error correction is to take place or whether it is a matter of a non-correctable error. Such a transmission system makes thus a combined correction of accidental errors (random errors) and error bursts possible in a single error correction means. The error correction means then only needs to comprise a shift register for defining the errors as a result of which a simple implementation is achieved.

For avoiding an erroneous correction, at least one check error pattern is stored in the control means of the decoder for a comparison to be made with an error pattern determined by storage contents of the shift register, the combining operation of the storage contents of the shift register with the storage contents of the storage unit being blocked when the check error pattern matches the error pattern. Consequently, prior to a correction operation there is a check, for example, with the aid of a Table in which basically binary check error patterns are stored. These check error patterns are compared with the error-case error pattern available in the shift register, and in this manner erroneous corrections, for example, in the event of errors which are wider apart than the correctable distance, are avoided. Excessive load on the decoder is thus detected.

For deriving the first error information signal, the storage contents of the shift register are verified in the decoder after the digital signal has been read-in and after each shift of the shift register. The decoder then operates according to the so-called error trapping method, which is described, for example, in "Error Control Coding Fundamentals and Applications", Shu Lin and Daniel J. Costello, pp. 125 to 131 and pp. 259 to 282. According to this method a specific number of memory locations of the shift register are checked for "0".

For distinguishing different cases, the decoder comprises a counter for counting the number of shifts of the shift register. With this counter the cases can be distinguished whether, for example, a burst error has occurred only at the locations of the check bits of the digital signal, or at what locations a burst error has been localized.

A simple correction of the information signal stored in the storage unit may be achieved in that a first Exclusive-OR gate is provided for combining the information signal with the output signal of the shift register.

The decoding of the digital signal is controlled in a simple manner, in that the decoder comprises a first gate for blocking the reading in of the digital signal, a second gate for blocking the reading in of the information signal from the storage unit, a third gate for blocking the feedback of the shift register and a fourth gate for blocking the signal delivery of the storage contents of the shift register and means for combining the storage contents of the shift register with the storage contents of the storage unit.

The function of the decoder is simply performed in that in the decoder the digital signal can be read-in in the storage unit and the feedback shift register in parallel when the second gate and the fourth gate are blocked, in that after the digital signal has been read-in in the shift register and after each shift of the shift register the predeterminable storage contents of the shift register are checked for burst errors and the aggregate storage contents are checked for random errors, in that a burst error detection means and a random error detection means drive the control means in response to the number of positions the shift register has shifted, so that the second gate and/or the third gate and/or the fourth gate are/is blocked and/or opened.

The invention will be further explained in the following with reference to the exemplary embodiments represented in the drawing.

DESCRIPTION OF THE PREFERRED EMBODIMENT

Figure 1:
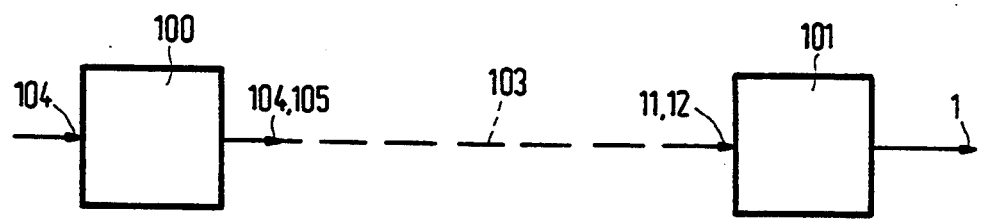
FIG. 1 shows a transmission system.

The transmission system represented in FIG. 1 comprises a transmitter 100 which is supplied with an information signal 104 to be transmitted/sent. At the output of the transmitter 100 there is a coded digital signal to be transmitted 104, 105, which is applied to a receiver 101 over the transmission channel 103. At the input of the receiver a received digital signal to be decoded 11, 12 is available whilst a decoded digital signal 1 is present at the output of the receiver.

The transmission system shown in FIG. 1 is suitable for use, for example. for transmitting a BCH coded video signal 105 for a videophone. The receiver 101 may then also be incorporated in a videophone. In the following the function of the transmission system shown in FIG. 1 will be briefly explained. The transmitter 100 comprises a coding means (not shown in FIG. 1 ) alternatively to be referenced coder hereinafter, which converts the information signal to be transmitted, for example, a digitized video signal into the digital signal to be transmitted 104, 105. The digital signal to be transmitted 104, 105 comprises the information signal to be transmitted. 104 and a redundancy signal 105 generated from the information signal 104. This redundancy signal 105 is used for the error correction on the receiver side. The digital signal 11, 12 received by the receiver thus contains both the information signal 11 and the redundancy signal 12. Differences between the digital signal to be transmitted 104, 105 and the received digital signal 11, 12 may occur as a result of disturbances caused by the transmission channel 103. It is an object of the decoder arranged in the receiver 101 to reconstruct the most probable original information or to detect that most likely uncorrectably many errors have occurred in the digital signal 11, 12. The function of the decoder will be explained in combination with FIG. 2.

Figure 2:
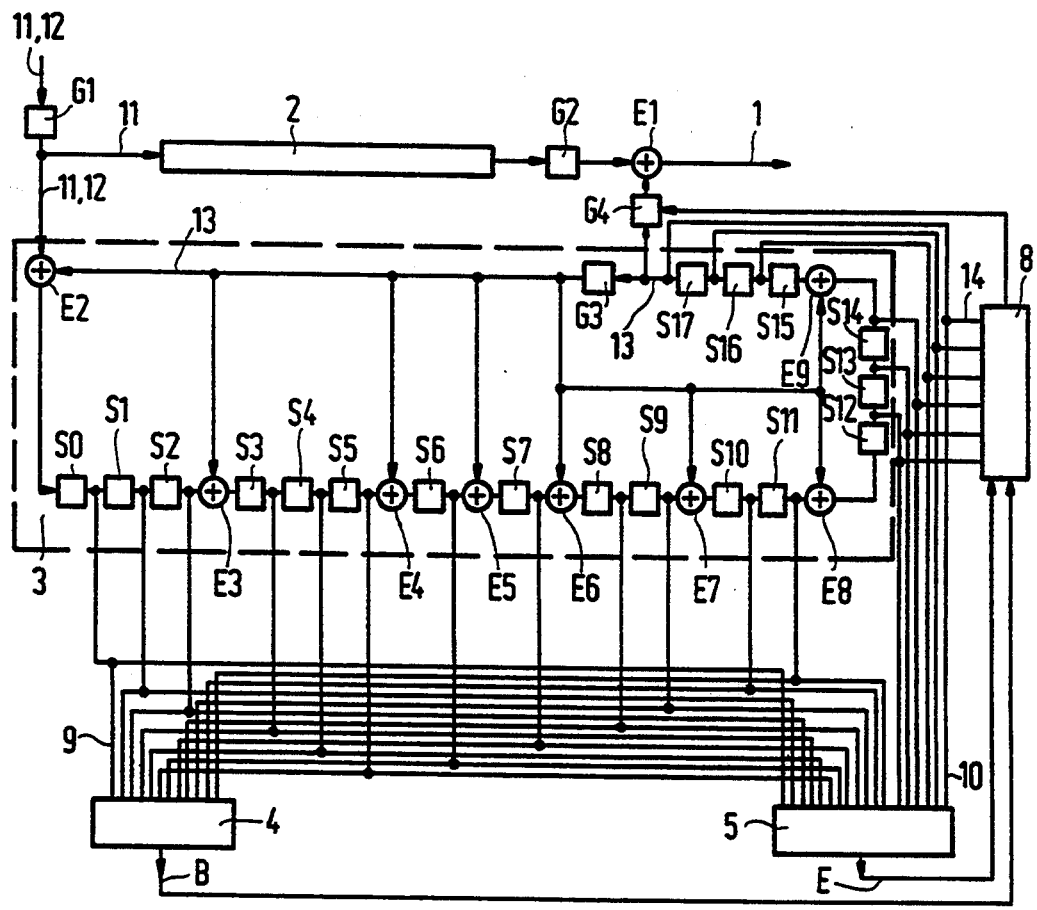
FIG. 2 shows a decoder.

FIG. 2 shows a decoder for a cyclically coded digital signal. The decoder shown in FIG. 2 comprises, in essence, a storage unit 2, a shift register 3, a random error detection means 5, a burst error detection means 4 as well as a control means 8. The decoder is supplied with a digital signal 11, 12 constituted by an information signal 11 and a redundancy signal 12, through a first gate G1. The delivery of the output signal of the storage unit 2 can be blocked by means of a second gate G2. The shift register is formed by 18 registers $S_0 \ldots S_{17}$. The feedback of the shift register can be blocked by means of the third gate G3. Furthermore, the output signal 13 of the shift register is applied through a fourth gate G4 to a first Exclusive-OR gate E1 which makes a combination with the output signal of the second gate G2 possible. At the output of the first Exclusive-OR gate E1 there is a decoded digital signal 1. The output signal of the third gate G3 is applied to a second Exclusive-OR gate E2 at the input of the shift register 3, to a third Exclusive-OR gate E3 inserted between the second register $S_2$ and the third register $S_3$, a fourth Exclusive-OR gate E4 inserted between the fifth register $S_5$ and the sixth register $S_6$, a fifth Exclusive-OR gate E5 inserted between the sixth register $S_6$ and the seventh register $S_7$, a sixth Exclusive-OR gate E6 inserted between the seventh register $S_7$ and the eighth register $S_8$, a seventh Exclusive-OR gate E7 inserted between the ninth register $S_9$ and the tenth register $S_{10}$, an eighth Exclusive-OR gate E8 inserted between the eleventh register $S_{11}$ and the twelfth register $S_{12}$ as well as a ninth Exclusive-OR gate E9 inserted between the register $S_{14}$ and the register $S_{15}$. The storage contents of the registers $S_0 \ldots S_{11}$ can be applied to a burst error detection means 4 over the connection lines 9. The storage contents of all the registers $S_0 \ldots S_{17}$ can be applied to the random error detection means 5 over further connecting lines 10. At the output of the burst error detection means 4 there is a first error information signal B featuring burst errors, whereas at the output of the random error detection means 5 there is a second error information signal E featuring random errors. The first and second error information signals B and E respectively, are applied to the control means 8 which, in addition, via connecting lines 14 also receives the storage contents of the registers $S_{12} \ldots S_{17}$. At the output of the control means 8 there is a control signal S which drives the fourth gate G4.

The decoder represented in FIG. 2 is suitable for a digital signal 11, 12 which is based on the (511,493) BCH code. For clarification, the basic structure of a coding/decoding path will be briefly discussed. An information vector comprising 493 information bits in the case of the (511-493) BCH code, is convened by a coder into a 511-bit-long code vector. Such a code vector thus consists of 493 information bits plus 18 check bits for a redundancy signal. The code vector is then corrupted into a receiver vector as a result of channel disturbances during transmission. This receiver vector corresponds to the digital signal 11, 12 represented in the drawing Figure and constituted by the information signal 11 and the redundancy signal 12, whilst the digital signal may be subjected to superimposed channel disturbances. It is the object of the decoder to reconstruct the most probable original information signal or to detect that most likely in the digital signal 11, 12 uncorrectably many errors have occurred. The cyclic coding is performed by a shift register circuit which has a structure corresponding to the shift register circuit 3 for decoding and represented in the drawing Figure. In a first step during the coding operation the information bits are read-in in the shift register which is a feedback shift register; in a second step the feedback path is interrupted after which the check bits are read out and together with the information bits form the complete coded digital signal. The redundancy signal is thus generated from the information signal by means of a cyclic code.

In the following the mode of operation of the decoder as shown in the drawing Figure will be described in steps A to C.

In step A, when the digital signal 11, 12 is being received, the information signal 11 is loaded in parallel in the storage unit 2 and the shift register 3. In the feedback shift register i.e. the third gate G3 is open, the contents of the shift register 3 are shifted to the right with each clock signal. During this operation the first gate G1 and the third gate G3 are open, whereas the second gate G2 and the fourth gate G4 are blocked. The storage unit 2 is now loaded with only the first 493 bits of the received digital signal 11, 12 i.e. the information signal. Once the received digital signal 11, 12 has been completely loaded in the feedback shift register, the contents the first 12 registers $S_O \ldots S_{11}$ are tested by the burst error detection means. This test is also performed after each shift of the shift register. If all the 12 registers $S_0 \ldots S_{11}$ have the contents "0", the burst error detection test is successful. This is the result of the principles for decoding by means of error trapping. The decoder shown in the drawing Figure is arranged so that a burst error up to a length smaller than 7 bits is discovered. If a burst error is discovered by means of the burst error detection means 4, three cases can be distinguished according to the number of shifts i.e. how often the shift register 3 has shifted. If the number of shifts lies between 0 and 12, it follows that a burst error has occurred at the locations of the check bits in the digital signal 11, 12 i.e. in the redundancy signal 12, and thus no correction is necessary. Consequently, the control means 8 opens the gate G2 and the decoded digital signal 1 is read out unchanged from the storage unit 2. If the number of shifts lies between 13 and 17, the 18 minus the number of shifts right-hand memories contain the error pattern at the locations of the check bits whilst the remaining next memories of the shift register 3 contain the error portion in the information signal. The third gate G3 now blocks the feedback and the shift register 3 is shifted until the number of shifts is 18. By that time the "right-hand" bits which contain the error portion in the check bits have been shifted out of the shift register 3 and are no longer used for correction purposes. The bits far right in the shift register correspond to the error portion in the information signal 11. The second gate G2 as well as the fourth gate G4 are driven and opened by the control means 8 and the errors that have occurred are corrected by a bit-by-bit modulo-2 addition by way of the Exclusive-OR gate E1. If the number of shifts exceeds 17, the second gate G2 is opened after the 18$^{th}$ shift of the shift register i.e. the information bits of the information signal 11 are delivered in timing with the clock signal. Simultaneously, the feedback shift register is shifted when gate G3 is open. Once the first 12 register contents $S_O \ldots S_{11}$ have all shown "0" the remaining 6 registers $S_{12} \ldots S_{17}$ contain the burst error pattern. The third gate G3 is then blocked and the fourth gate G4 opened, so that the information can be corrected with the aid of the first Exclusive-OR gate E1. If the number of shifts is 511 and if the contents of the 12 first registers $S_O \ldots S_{11}$ are never simultaneously "0", an error pattern has occurred which cannot be corrected with this method. In that case the delivered information signal 11 most probably contains errors. In that case an error is detected, but a correction is not carried out.

The decoder represented in the drawing FIG. 2 is not only suitable, however, for burst error correction, but in addition to the burst error detection means 4 also the random error detection means 5 is provided which is suitable for carrying out a correction of random errors which is also based on the error trapping method. The decoder shown in the FIG. 2 makes a correction possible of all the error patterns having a weight smaller than 2 which occur in 18 successive locations. The random error correction is carried out in parallel with the burst error correction and will be described hereinafter. First, in accordance with the description of the burst error correction, the received digital signal 11, 12 is read-in in the shift register. Once the digital signal 11, 12 has been completely read-in in the shift register 3, the random error detection means 5 checks the so-called weight of the syndrome register contents i.e. a number of registers $S_O \ldots S_{17}$ are determined which do not have the "0" contents. If the weight i.e. the number of register contents differing from 0, exceeds 2, it follows that no decision is possible in which case the feedback shift register is shifted i.e. the third gate G3 is opened. If the random error detection means 5 detects a weight smaller than or equal to 2 immediately after the digital signal 11, 12 has been read-in, errors have only occurred in the check bits of the digital signal and thus no correction of the information signal is necessary. In this case the gate G2 is closed and the information is read out unchanged as information signal 1. If the error detection test with the aid of the error detection means 5 is successful, the so-called error pattern is stored in the shift register 3. According to the number of shifts which are determined by means of a counter, two cases can be distinguished for the random error correction. If the number of shifts lies between 0 and 18, the feedback path will be blocked by means of the gate G3 and the shift register contents will be shifted in timing with the clock signals until the number of shifts is 18. Subsequently, while the second gate G2 and the fourth gate G4 are closed, the error correction will be carried out by means of the first Exclusive-OR gate E1. If the number of shifts exceeds 18, the second gate G2 will be closed i.e. the information bits will be delivered in timing with the clock signal while, simultaneously, the contents of the shift register 3 are shifted with a blocked feedback path. Once the weight i.e. the number of locations $S_O \ldots S_{17}$ of the shift register having contents differing from 0, is smaller than or equal to 2, the third gate G3 blocks the feedback path, the gate G4 will be closed and the information will be corrected in timing with the clock signals. If the number of shifts is 511 and if the condition that the weight i.e. the number of locations of the shift register having contents differing from 0, is smaller than or equal to 2 can never be satisfied in 511 clock periods, no error correction can be carried out with this decoder. In that case the received information signal 1 most probably contains an error.

In the decoder shown in the drawing FIG. 2 at least one check pattern is stored in the control means 8, which pattern can be compared with an error pattern determined by the storage contents $S_{12} \ldots S_{17}$ of the shift register 3. For this purpose, the error pattern is applied to the control means 8 over connection lines 14. The object is to detect an overload of the decoder so as to avoid erroneous corrections. Prior to a correction there is thus a check during which binary error patterns are detected and thus the probability of an erroneous correction is reduced.

In the exemplary embodiment a decoder for a BCH coded digital signal is described, but an implementation of the invention also for other cyclically coded digital signals is possible.

We claim:

1. A transmission system comprising a transmitter and a receiver, said transmitter including a coder for generating a cyclic code from an information signal, which is to be transmitted, so as to transmit a digital signal constituted by said information signal and a redundancy signal, and said receiver including a decoder comprising (a) a storage unit for storing at least a portion of the received digital signal equivalent to said information signal, and (b) an error correction means comprising a feedback shift register having an aggregate storage content, burst error detection means for producing a first error information signal, based on the storage content of a predetermined portion of said shift register less than said aggregate storage content, indicating that a burst error has been trapped, and means including a combining element, responsive to said first error information signal, for selectively combining contents of the shift register and contents of the storage unit to provide an output signal, corrected for burst errors, corresponding to said information signal, characterized in that said error correction means further comprises a random error detection means for producing a second error information signal, based on said aggregate storage content, indicating that at least one location of a random error has been identified, and responsive to said second error signal, said means for selectively combining controls said combining element on a bit-by-bit basis to correct random errors in the received digital signal.

2. Transmission system as claimed in claim 1, characterized in that at least one check error pattern is stored in the control means (8) of the decoder for a comparison to be made with an error pattern determined by storage contents ($S_{12}...S_{17}$) of the shift register (3), the combining operation (E1) of the storage contents ($S_0...S_{17}$) of the shift register (3) with the storage contents of the storage unit (2) being blocked when the check error pattern matches the error pattern.

3. Transmission system as claimed in one of the claim 1, characterized in that for deriving the first error information signal (B), the storage contents ($S_0...S_{11}$) of the shift register are verified in the decoder after the digital signal (11, 12) has been read-in and after each shift of the shift register (3).

4. Transmission system as claimed in claim 1, characterized in that the decoder comprises a counter for counting the number of shifts of the shift register (3).

5. Transmission system as claimed in claim 1, characterized in that a first Exclusive-OR gate (E1) is provided for combining (E1) the information signal (11) with the output signal (13) of the shift register (3).

6. Transmission system as claimed in claim 1, characterized in that the decoder comprises a first gate (G1) for blocking the reading in of the digital signal (11, 12), a second gate (G2) for blocking the reading in of the information signal (11) from the storage unit (2), a third gate (G3) for blocking the feedback of the shift register (3) and a fourth gate (G4) for blocking the signal delivery of the storage contents ($S_0...S_{17}$) of the shift register (3) and means for combining (E1) the storage contents ($S_0...S_{17}$) of the shift register (3) with the storage contents of the storage unit (2).

7. Transmission system as claimed in claim 1, characterized in that in the decoder the digital signal (11, 12) can be read-in in the storage unit (2) and the feedback shift register (3) in parallel when the second gate (G2) and the fourth gate (G4) are blocked, in that after the digital signal (11, 12) has been read-in in the shift register (3) and after each shift of the shift register (3) the predeterminable storage contents ($S_0...S_{11}$) of the shift register are checked for burst errors and the aggregate storage contents ($S_0...S_{17}$) are checked for random errors, in that a burst error detection means (4) and a random error detection means (5) drive the control means (8) in response to the number of positions the shift register (3) has shifted, so that the second gate (G2) and/or the third gate (G3) and/or the fourth gate (G4) are/is blocked and/or opened.

8. A receiver for a cyclic coded information signal, transmitted as a digital signal constituted by said information signal and a redundancy signal through a channel which can introduce burst errors and random errors, said receiver including a decoder compressing (a) a storage unit for storing at least a portion of the received digital signal equivalent to said information signal, and (b) an error correction means comprising a feedback shift register having an aggregate storage content, burst error detection means for producing a first error information signal, based on the storage content of a predetermined portion of said shift register less than said aggregate storage content, indicating that a burst error has been trapped, and means including a combining element, responsive to said first error information signal, for selectively combining contents of the shift register and contents of the storage unit to provide an output signal, corrected for burst errors, corresponding to said information signal, characterized in that said error correction means further comprises a random error detection means for producing a second error information signal, based on said aggregate storage content, indicating that at least one location of a random error has been identified, and responsive to said second error signal, said means for selectively combining controls said combining element on a bit-by-bit basis to correct random errors in the received digital signal.

9. A decoder for a cyclic coded information signal, which is received as a digital signal constituted by said information signal and a redundancy signal, which can contain burst errors and random errors, said decoder comprising (a) a storage unit for storing at least a portion of the received digital signal equivalent to said information signal, and (b) an error correction means comprising a feedback shift register having an aggregate storage content, burst error detection means for producing a first error information signal; based on the storage content of a predetermined portion of said shift register less than said aggregate storage content, indicating that a burst error has been trapped, and means including a combining element, responsive to said first error information signal, for selectively combining contents of the shift register and contents of the storage unit to provide an output signal, corrected for burst errors, corresponding to said information signal, characterized in that said error correction means further comprises a random error detection means for producing a second error information signal, based on said aggregate storage content, indicating that at least one location of a random error has been identified, and responsive to said second error signal, said means for selectively combining controls said combining element on a bit-by-bit basis to correct random errors in the received digital signal.

10. A videophone for a cyclic coded information signal, transmitted as a digital signal constituted by said information signal and a redundancy signal through a channel which can introduce burst errors and random errors, said videophone including a decoder comprising (a) a storage unit for storing at least a portion of the received digital signal equivalent to said information signal, and (b) an error correction means comprising a feedback shift register having an aggregate storage content, burst error detection means for producing a first error information signal, based on the storage content of a predetermined portion of said shift register less than said aggregate storage content, indicating that a burst error has been trapped, and means including a combining element, responsive to said first error information signal, for selectively combining contents of the shift register and contents of the storage unit to provide an output signal, corrected for burst errors, corresponding to said information signal, characterized in that said error correction means further comprises a random error detection means for producing a second error information signal, based on said aggregate storage content, indicating that at least one location of a random error has been identified, and responsive to said second error signal, said means for selectively combining controls said combining element on a bit-by-bit basis to correct random errors in the received digital signal.

* * * * *